(12) United States Patent
Zellweger

(10) Patent No.: US 6,317,734 B1
(45) Date of Patent: Nov. 13, 2001

(54) METHOD AND APPARATUS FOR MANAGING REAL-TIME MARKETING TRIGGERS ON A CONTENT MENU

(75) Inventor: Paul Zellweger, 82 Fresh Pond La., Cambridge, MA (US) 02138

(73) Assignee: Paul Zellweger, Cambridge, MA (US)

( * ) Notice: Subject to any disclaimer, the term of this patent is extended or adjusted under 35 U.S.C. 154(b) by 0 days.

(21) Appl. No.: 09/368,332

(22) Filed: Aug. 3, 1999

Related U.S. Application Data

(60) Provisional application No. 60/095,810, filed on Aug. 7, 1998.

(51) Int. Cl.[7] ..................................................... G06F 17/30
(52) U.S. Cl. ................................. 707/1; 707/3; 707/100; 707/103; 707/104; 345/356; 345/357
(58) Field of Search ....................... 707/1, 100, 103–104, 707/3; 705/26, 27; 345/356, 357

(56) References Cited

U.S. PATENT DOCUMENTS

| | | | |
|---|---|---|---|
| 5,241,671 | * | 8/1993 | Reed et al. ............................ 707/104 |
| 5,537,590 | * | 7/1996 | Amado .................................... 707/1 |
| 5,630,125 | * | 5/1997 | Zellweger ............................ 707/103 |
| 5,864,856 | * | 1/1999 | Young et al. ........................ 707/100 |
| 6,212,514 | * | 4/2001 | Eberhard et al. ........................ 707/2 |

* cited by examiner

Primary Examiner—Hosain T. Alam
Assistant Examiner—Cam-Y Truong

(57) ABSTRACT

The present disclosure improves upon the prior art of the content menu and its ability to generate end-user profiles paths taken by end-users. These profiles differentiate one end-user from another based on word usage and their mastery of the content. The present disclosure teaches how to built and manage a collection of software routines and how to link these routines to information objects accessed by the content menu. When end-users reach information from a content menu with the present invention the end-user profile can fire one of these routines to respond to a user's needs in real-time and thereby pave the way for a new generation of interactive marketing capabilities known as marketing triggers.

20 Claims, 10 Drawing Sheets

METHOD AND APPARATUS FOR MANAGING REAL-TIME MARKETING TRIGGERS ON A CONTENT MENU

CROSS REFERENCE TO RELATED APPLICATION

This application is based on Provisional Application No. 60/095,810 entitled Method and Apparatus for Using an Open Hierarchical Data Structure to Manage Real-Time Marketing Triggers, filed Aug. 7, 1998.

REFERENCES

| | | |
|---|---|---|
| 5,630,125 | 5/13/97 | Zellweger |
| 09/080,100 | 5/16/98 | Zellweger, now U.S. Pat. No. 6,243,700 |
| 09/080,102 | 5/16/98 | Zellweger |
| 09/277,015 | 3/26/99 | Zellweger |
| 5,864,856 | 4/95 | Young et al. |
| 5,537,590 | 8/93 | Amado |
| 5,241,671 | 10/89 | Reed |

OTHER REFERENCES

Hoffman Donna and T. P. Novak. "A New Marketing Paradigm for Electronic Commerce." The Information Society, Special Issue on Electronic Commerce, 13, Jan–Mar, 1996.

McKenna, Regis. "Real-Time Marketing." Boston, Mass.: Harvard Business Press, 1997.

Zellweger, Paul "Web-based Sales: Defining the Cognitive Buyer". *International Journal of Electronic Markets.* Vol., Number 1997, pp. 14–22.

Zellweger Paul. The Knowledge Tree. unpublished paper, copyright ArborWay Electronic Publishing, Inc. Jan. 3, 1998

FIELD OF INVENTION

The present invention relates to computer software used to build and maintain an end-user menu system known as a content menu and, more specifically, it relates to an improvement of this menu that enables menu developers to integrate and fire real-time marketing triggers based on end-user profiles.

BACKGROUND

Traditional mass marketing activities have been transformed by the Internet. For example, broadcast marketing issues information from a single source to multiple receivers in a one-to-many relationship model. In contrast, marketing on the Web follows a different model, described by Hoffman (1996) as many-to-many where many sources broadcast to many different individuals. With the introduction of the content menu Zellweger (1997) observes another type of model, many-to-one where multiple access paths lead to the same unit of information. Yet, McKenna (1997) views the most significant difference in Web-based marketing is not in its relationship models but in its interactive capabilities and, in particular, its ability to process marketing data in real-time.

Zellweger (U.S. Pat. No. 5,630,125) disclosed the means to build a content menu using an open hierarchical data structure. Next, Zellweger disclosed how to implement the content menu using hypertext links optimized for traffic on the Web (09/080,100). A further disclosure by Zellweger teaches how to implement a content menu using an applet technology like Java that is optimized for client server communication (09/080,102).

More recently, Zellweger disclosed how to generate and manage end-user profiles (09/277,015) based on paths buyers select to locate products in an electronic catalog. End-user profiles include information like the level of help end-users needed to find information and differences in training and background as judged by their word usage. By looking at cognitive and linquistic differences amongst end-users, this prior invention introduces a new way to conduct end-user marketing research on a network, create profiles, and track these profiles over time. However, this prior disclosure does not teach how to apply this art to expand interactive marketing capabilities.

SUMMARY OF THE INVENTION

This present invention discloses how an online system can employ end-user profiles to invoke computer-initiated events that respond to their needs. These events are known as marketing triggers and are based on software routines that employ multimedia to engage end-users in a marketing dialog. The prior art of end-user profiles was helpful in identifying their needs by tracking the menu path they selected in a content menu. The present invention improves upon this prior art by disclosing how to manage a collection of trigger routines, integrate them into an end-user application, and use the prior art of end-user profiles to fire a specific trigger routine at runtime. By disclosing these capabilities the present invention paves the way for a new generation of interactive marketing tools that deliver real-time processing.

Developers are free to program any type of trigger routine. This enables them to employ a wide variety of technologies to respond to different situations and needs. This includes software routines or application scripts that generate and transmit e-mail messages, add names and addresses to marketing databases, link a buyer and salesperson together via a user interface that includes voice and or video communication, or pass control to another application.

DETAILED DESCRIPTION OF THE FIGURES

To provide an example of the present invention this disclosure will revisit the prior art of the electronic catalog described by Zellweger (U.S. Pat. No. 5,360,125). However, in this example the electronic catalog depicts a collection of books. At the upper-most level of its content menu four major topics are presented: authors, languages, subject, and titles. Each one of these topics, in turn, links to a one or more sublists that refine the initial topic and provide multiple ways to locate the same book. The developer of the electronic catalog employed prior art to generate end-user profiles (09/277,015) and define a trigger event (U.S. Pat. No. 5,630,125). In this case, making a request to order a book is such a trigger event.

Figure 1:
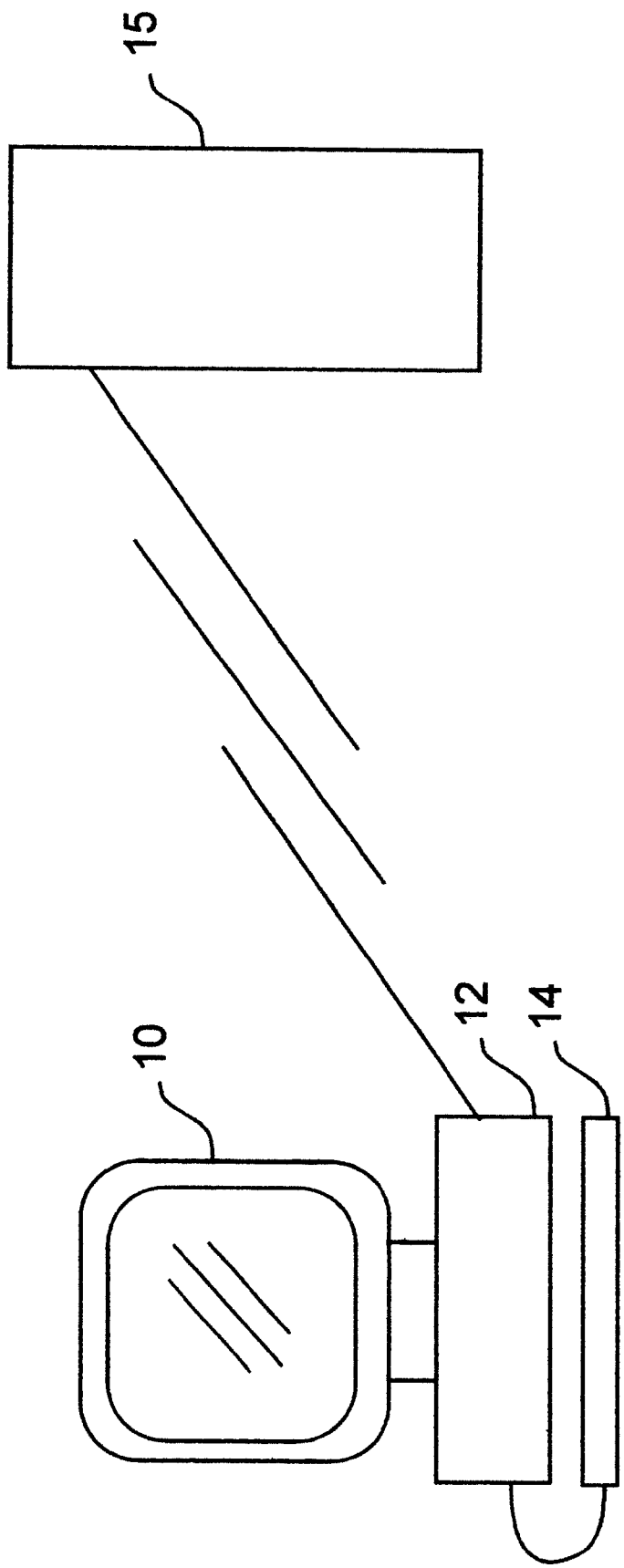
FIG. 1 depicts the graphic representation of the client-server apparatus of the present invention.

FIG. 1 depicts an embodiment of the client server apparatus of the present invention. The server computer 15 includes an operating system, a database management system and communications software. A client computer 12 is linked electronically to the server computer 15 via network software like the World Wide Web. The client computer 12 has its own operating system and communication software that enables it to request files stored on server 15 and use a commercially available browser software, like Netscape, to create and display information on monitor 10.

In the prior art of the content menu software components run both on client 12 and server 15, as well as on client 12 as a standalone computer. In the present invention software components used by a menu developer to create and integrate the real-time marketing methods also reside and execute in both network and standalone settings.

Figure 2:
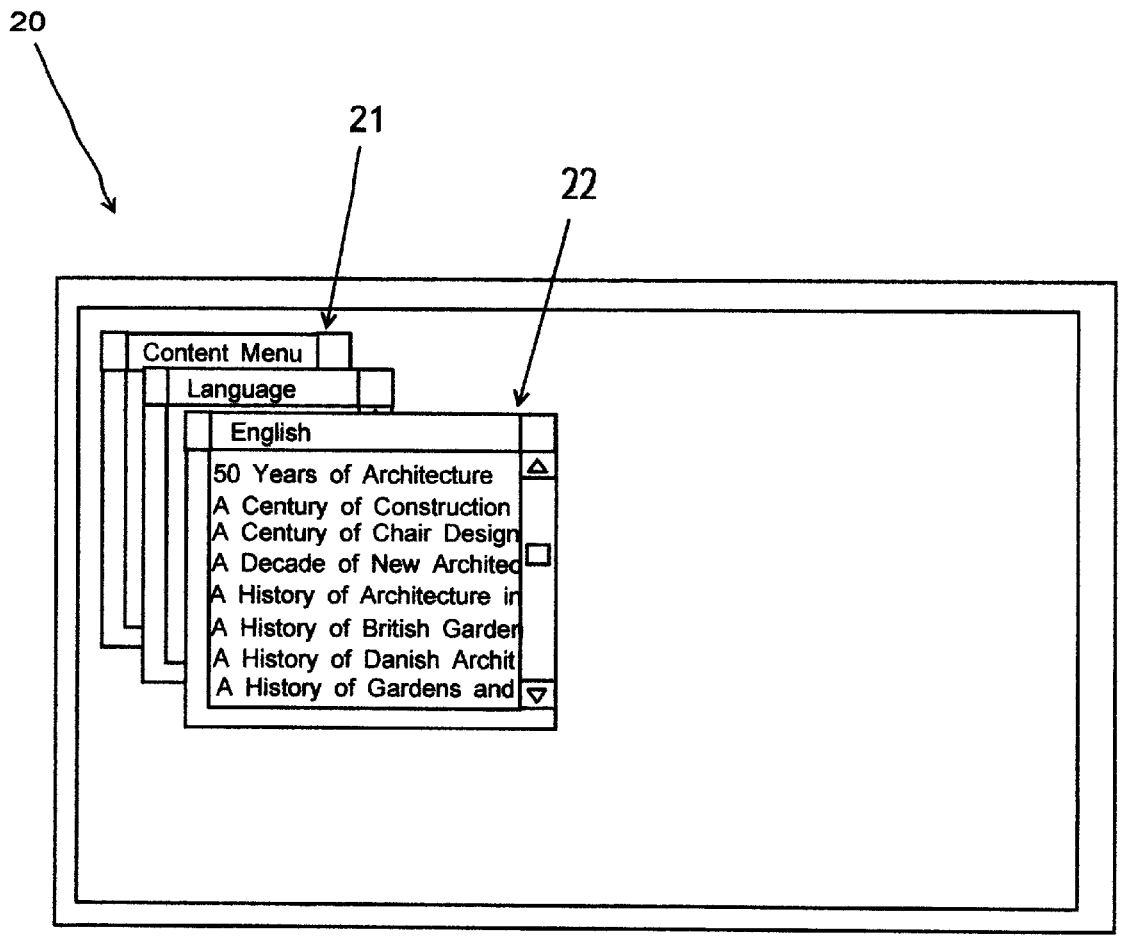
FIG. 2 depicts a graphic representation of the prior art of the end-user access method known as a content menu.

A graphic representation of the prior art of the content menu 21 is depicted in FIG. 2. Monitor 10 displays the content window 20 on an end-user's computer 12. The content menu interface 21 includes one or more nested list menu 22 that form a menu path. The distinctive feature of 21 is that unlike the mutually exclusive paths of its binary menu structure counterpart, its menu paths can represents different ways to locate the same information object.

When an end-user selects an entry in list menu 22, content menu 21 generates another list menu or an information object at the end of a menu path. Each list menu 22 includes one or more entries, a menu title, and if needed, a scrolling device. The menu title in 22 is derived from the selection made in the most recent list menu 22 in 21.

Figure 3:
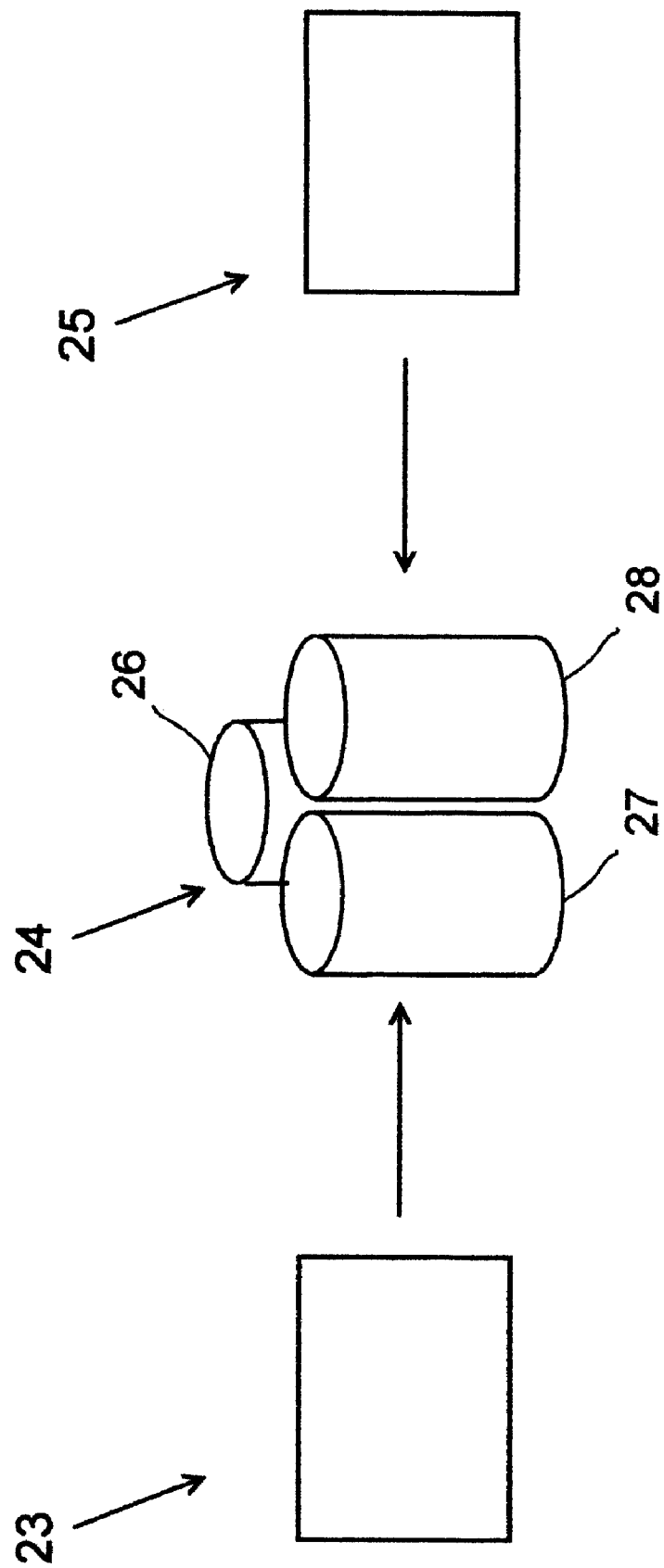
FIG. 3 depicts the three primary software components of the content menu.

The three major software components of content menu 21 are depicted in FIG. 3. This includes an authoring system 23, menu files 24, and browser software 25 that processes the menu files 24 to display content menu 21.

Authoring system 23 includes the prior art of building and maintaining an open hierarchical data structure, the basis for the content menu. Authoring system 23 uses this structure to organize information under topics and generate menu files 24 processed by the browser 25.

The present invention improves upon the prior art of authoring system 23 by providing management tools to organize trigger routines and integrate them with information objects in an existing content menu. This includes a configuration interface that removes developers from the technical details required to manage the linkage between trigger routines and information objects, as well as technologies to generate a source code file used to dispatch calls to trigger routines at runtime.

Menu files 24 in the present invention include the prior art of menu data files 26 and script files 27. The script files 27 include software routines run on server 15 to manage and generate the prior art of the content menu and its end-user profile. The present invention improves upon script files 27 with functions that call to dispatch files 28. Dispatch files 28 are generated by authoring system 23 of the present invention and represent an embodiment of the present invention that calls trigger routines at runtime based on end-user profiles.

Figure 4:
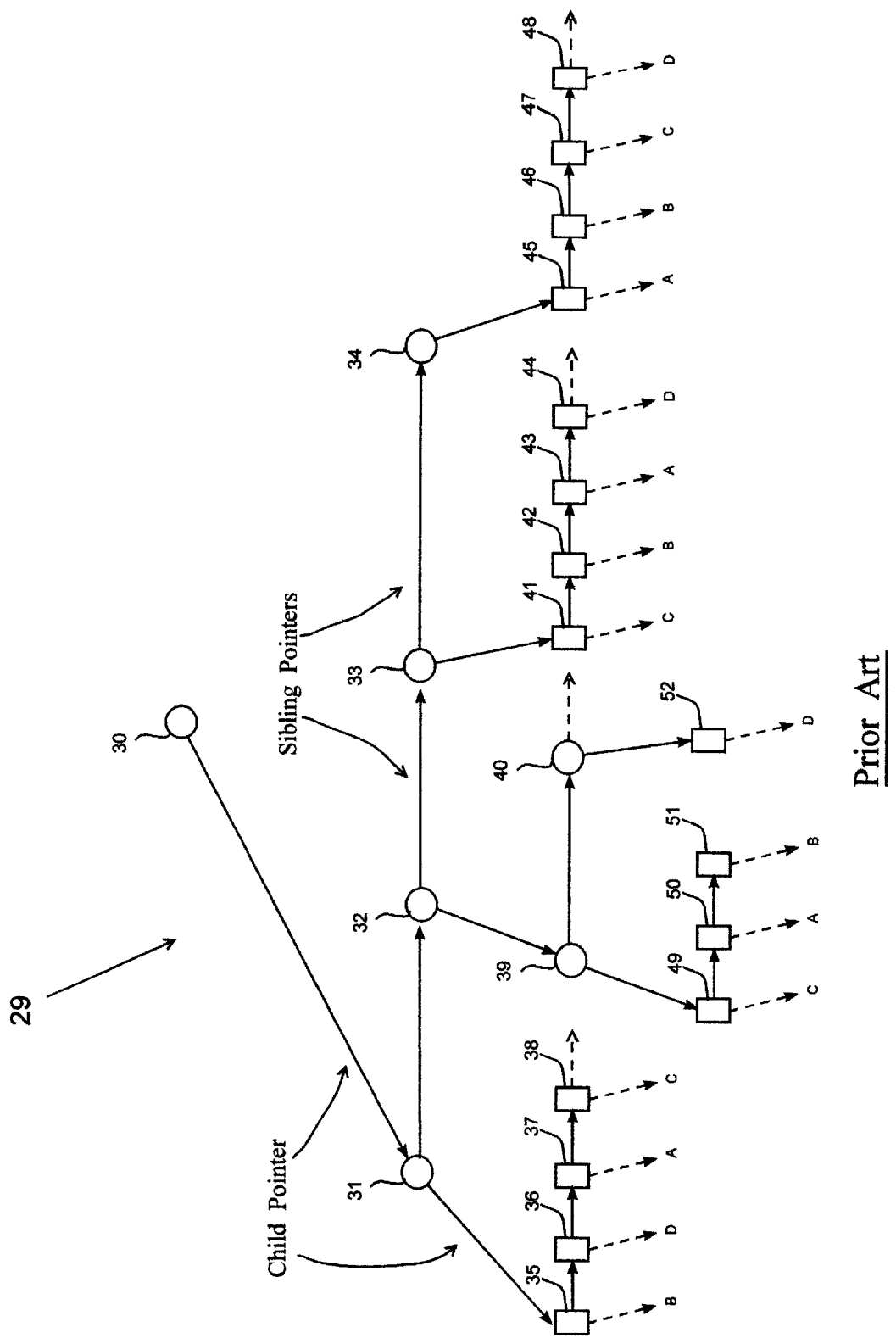
FIG. 4 depicts a graphic representation of the prior art of the open hierarchical data structure, the underlying basis for the content menu.

FIG. 4 depicts the prior art of the open hierarchical data structure 29, the basis for content menu 21. In structure 29 flow progresses downward from a root node 30 through one or more branching nodes like node 31 or 34 to reach a data or leaf node like 35 that links to an information object A at the end of a path.

Information keys associated with each node from structure 29 represents a topic entry in a list menu. Sibling pointers or arcs create a list of nodes that correspond to topic entries in list menu 22. Child pointers or arcs link an entry in list menu 22 to another list menu 22 or to an information object like A, B, C, or D. Nodes and information objects organized by structure 29 can have more then one incoming arc. This means that any topic node below root 30 can have more than one parent node. This capability enables structure 29 and its content menu 21 to represent different ways to reach the same information, a unique and distinctive feature of this menu art.

Figure 5:
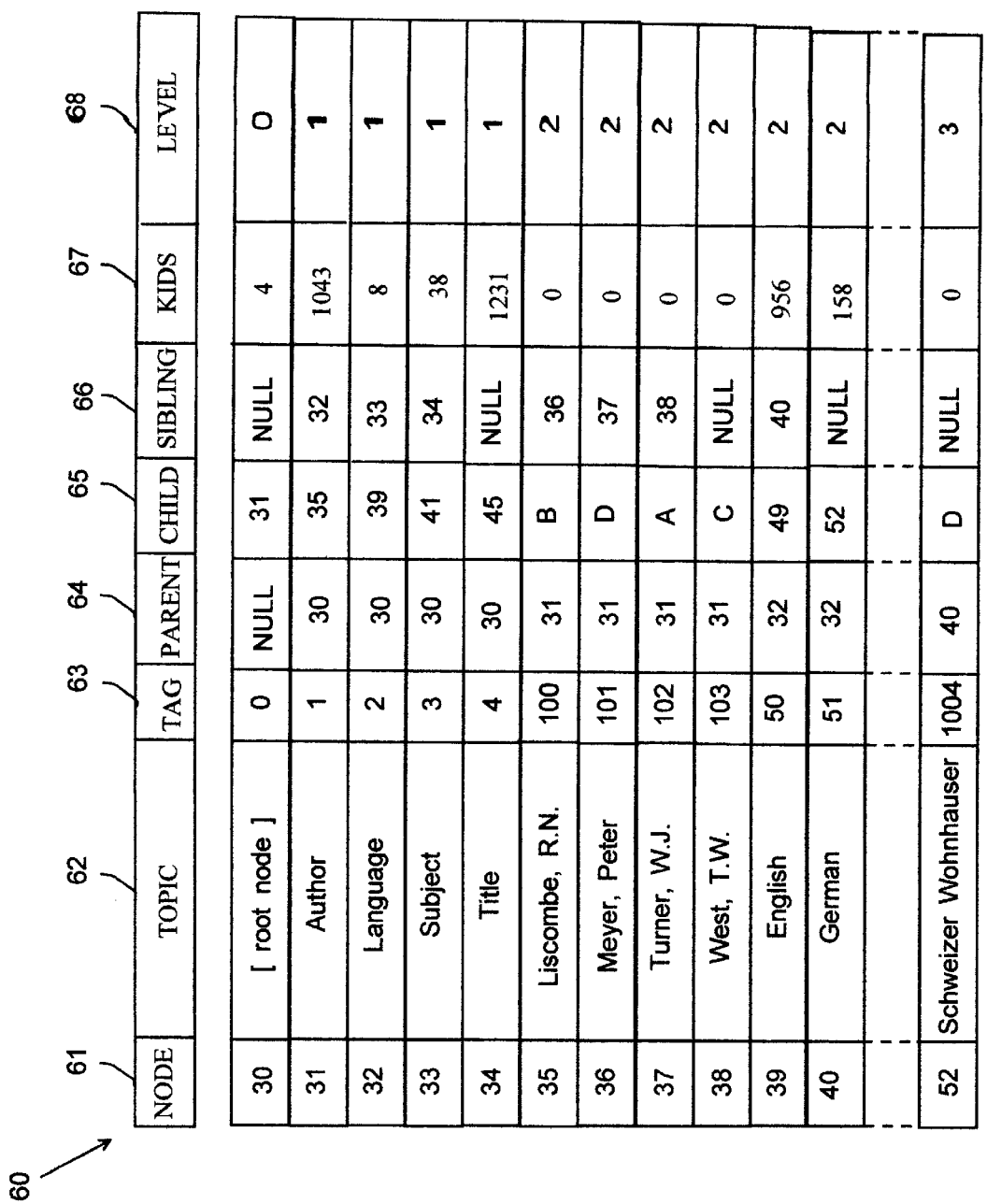
FIG. 5 depicts a database structure of the prior art that represents nodes in the open hierarchical data structure.

In the preferred embodiment of the present invention elements in database structure 60 represent nodes in open hierarchical data structure 29. FIG. 5 depicts each node in FIG. 4 as an element in structure 60. This includes a unique identifier NODE 61 and its information key TOPIC 62. It also includes TAG 63 that represents data associated with the prior art of generating end-user profiles, as well links to other nodes in 29 such as PARENT 64, CHILD 65, and SIBLING 66. SIBLING 66 links a node to other nodes in list menu 22. CHILD 65 links a node to its next menu object, either another list or an information object. And, PARENT 64 links a node to its primary parent in 29, all other parents known as step-parents are considered secondary relationships.

Figure 6:
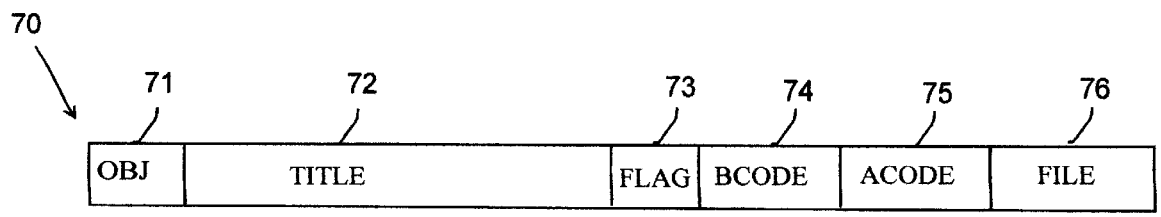
FIG. 6 depicts a database structure that stores information about each information object in the collection.

Each information object associated with a content menu is represented by an element in structure 70 depicted in FIG. 6. Each element in structure 70 includes a unique object identification OBJ 71, a name or TITLE 72, FILE 76, and information used to implement the present invention such as FLAG 73, BCODE 74, and ACODE 75.

The BCODE 74 and ACODE 75 depict dispatch codes associated with the information object. Each dispatch code contains subfields that represent information on trigger routines and associated end-user profiles. And, FLAG 73 is used by the authoring system 23 in the present invention to assign dispatch code 95 to 74 and 75 in 70.

In the preferred embodiment of the present invention database 70 uses FILE 76 to refer to a content file on the network that represents an information object. Alternative embodiments of the present invention include one or more fields that enables the present invention to generate an information object at runtime.

Figure 7:
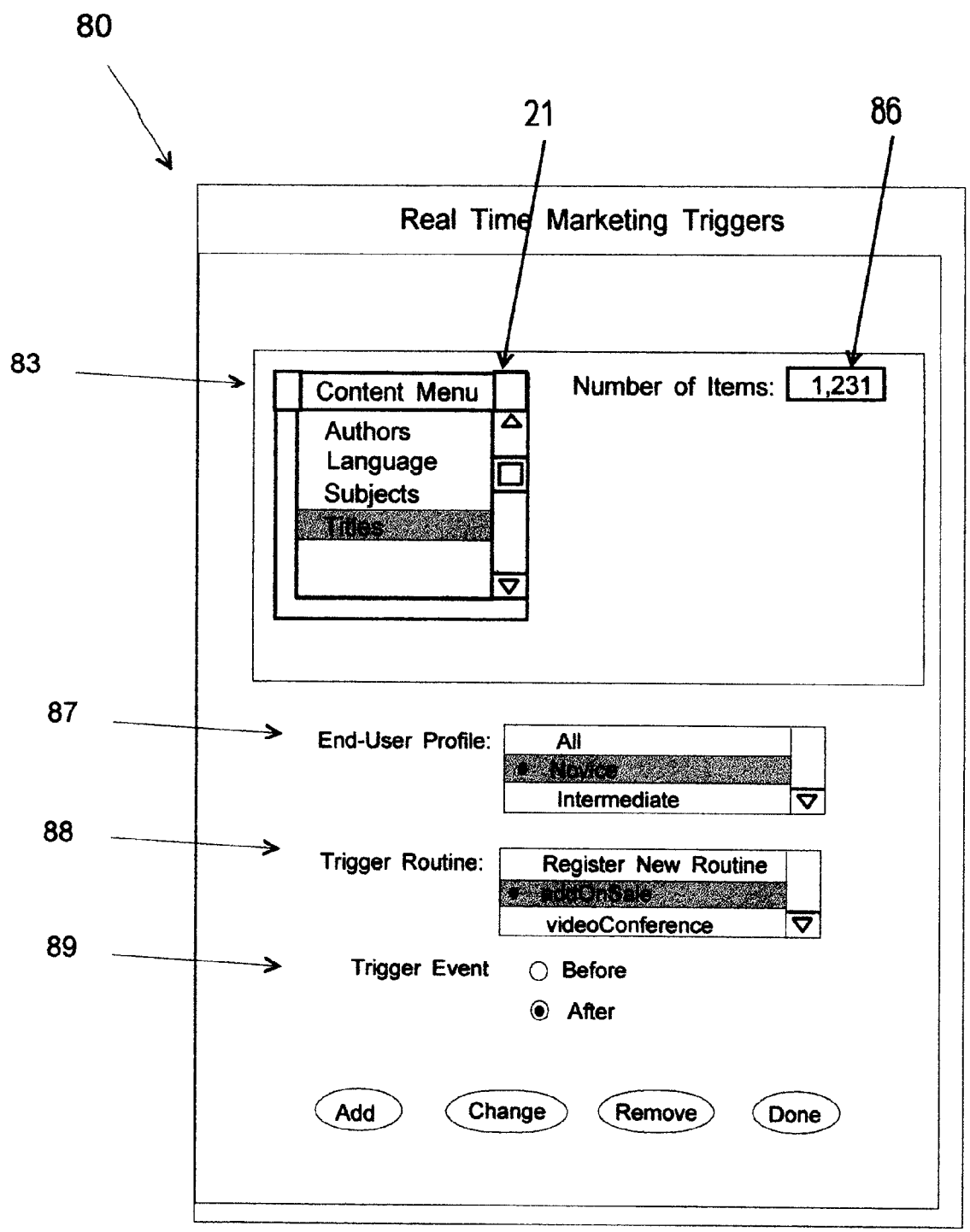
FIG. 7 depicts the trigger configuration window of the present invention.

Configuration interface 80, depicted in FIG. 7, is an interactive menu used by a menu developer to assign dispatch codes to information objects in database structure 70. First the developer navigates content menu 21 in region 83 to highlight a topic in list menu 22 to select information objects in its path. The actual number of objects are displayed in 86. Next, the developer selects an end-user profile setting in 87, a trigger routine in 88, and when this routine is called in 89, before or after a trigger event. Note, a bullet dot next to list menu entry in 87 or 88 indicates an existing setting.

End-user profiles displayed in region 87 represent prior art. For instance, each profile group depicted in the list menu represents a different level of content mastery as determined by the amount of help provided in a menu path. In region 89 developers can select a trigger routine from a list of previously registered ones, or they can enter a new one by selecting Register a New Routine. Finally, command buttons at the bottom of the window 80 enable the developer to Add a new dispatch code to the selected information objects, or Change or Remove an existing one. The Done button returns the developers back to the main menu in authoring system 23.

Figure 8:
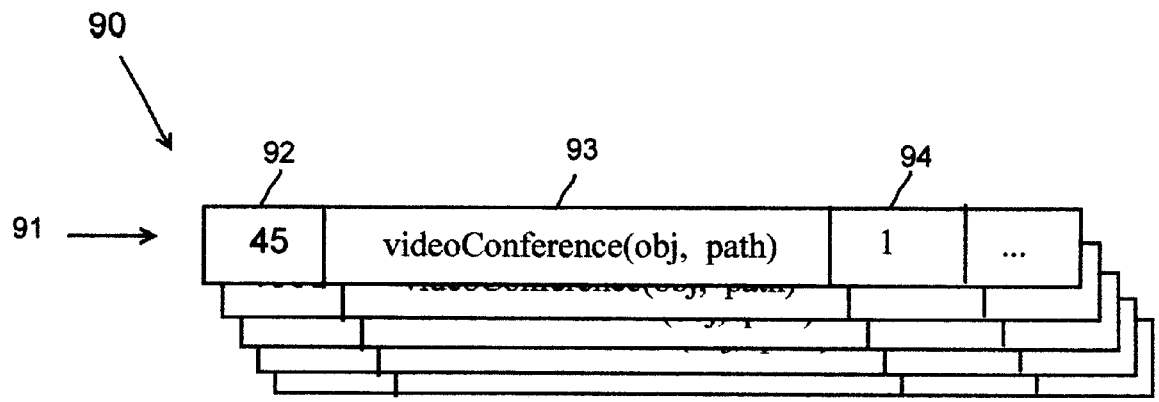
FIG. 8 depicts a database structure that stores information on a set of trigger routines.

FIG. 8 depicts the record structure of database 90 that stores information on trigger routines registered by a developer. Each time a new trigger routine is registered, authoring system 23 in the present invention adds a new record entry to database 90. Each database record 91 includes a unique identification code in 92 and the source code used to call the routine in 93. Each trigger routine record also includes a numeric value associated with the profile level 94 selected by the developer in menu 88 of the configuration window 80. In this example, values associated with 94 are 0 for novice, 1 for intermediate, 2 for expert, and 3 for all users.

Each time the developer selects a registered trigger routine that has a different profile setting from the original, authoring system 23 in the present invention adds a new record to 90 to represent a new combination of routine and profile setting.

Figure 9:
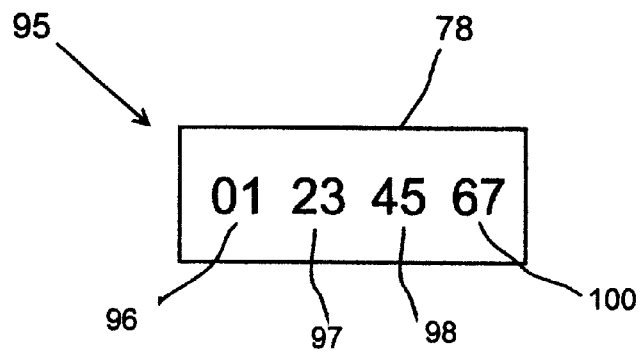
FIG. 9 depicts the field structure of a dispatch code.

Each dispatch code 95, depicted in FIG. 9, consists of a series of subfields or coded positions that represent each end-user profile group. As mentioned previously, the present invention relies on the prior art of the end-user profile so subfield 96 corresponds to novice level of content mastery, 97 to an intermediate, 98 to an expert, and subfield 100 represents all levels. The actual value or code in each subfield position directly corresponds to a trigger routine identifier 92 in database 90.

Figure 10B:
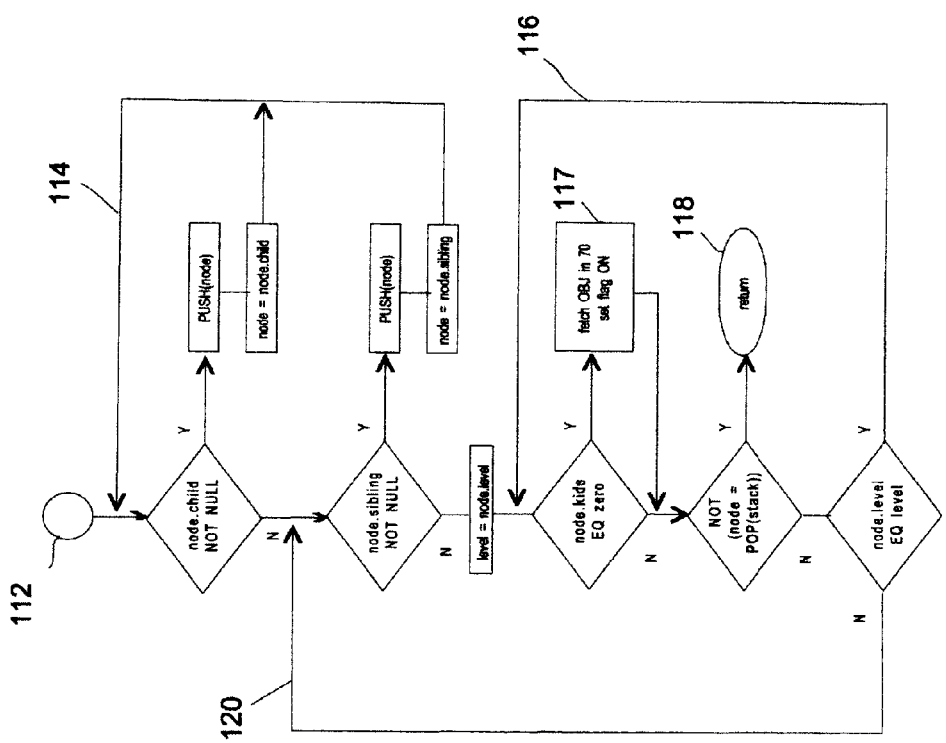
FIGS. 10a and 10b depict the flow chart of the routine in the present invention which sets dispatch codes associated with objects in an information system.
Figure 10A:
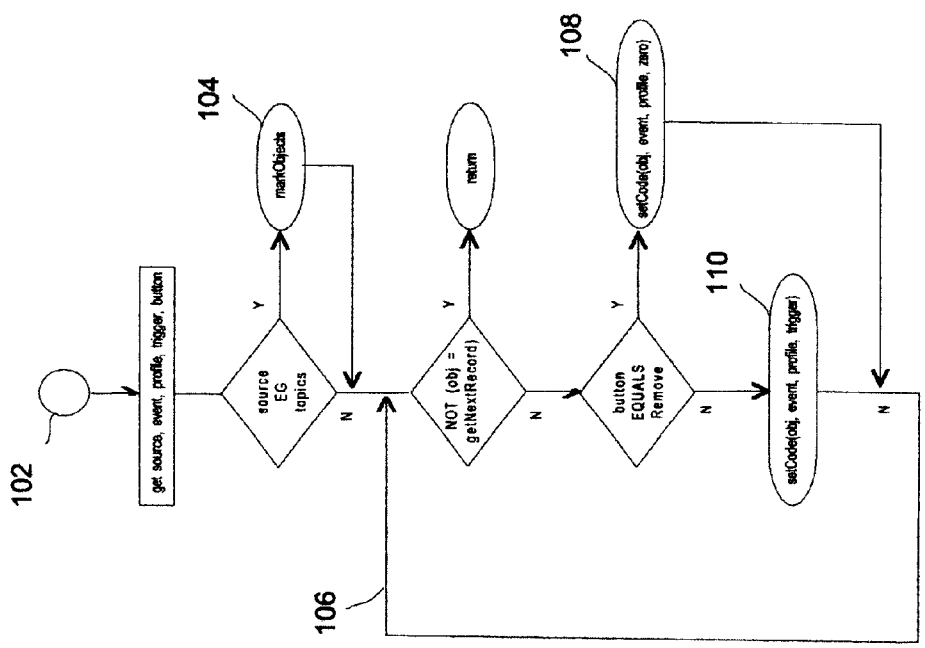

FIGS. 10a and 10b depict the flow chart of the program logic that assigns and updates dispatch codes 95 in BCODE 74 and ACODE 75 in information object database 70.

Routine 102, depicted in FIG. 10a, is called when the menu developer selects the Add, Change, or Remove buttons in configuration interface 80. First, routine 102 fetches selections made by the developer in 80 such as node from list menu 22 in 83, profile in 87, Trigger in 88, and event in 89. Next, setObjects routine 112 is called at 104. SetObjects 112 sets FLAG 73 "On" for all information object records in 70 that can be reached node or the highlighted topic in 21 in region 83 of 80. Next, control falls to loop 106 where routine 102 iterates through each information object record in database 70 where flag 73 is "on". If Remove was selected by the developer in 80 then the setCode routine has a zero argument for the trigger code. Otherwise, the developer selected the Add or Change button and setCode routine uses the new Trigger value.

The setCode routine is called from 108 and 110 in 102 to assign values to BCODE 74 and ACODE 75 to information object records in 70. Routine 102 passes four arguments to setCode: obj corresponds to OBJ 71, event designates before or after, profile corresponds to the coded settings in 88, and trigger corresponds to the coded setting in 92 of 90. First, setCode fetches obj record in database 70 and retrieves BCODE 74 and ACODE 75. Next, it replaces trigger in a subfield of 95 corresponding to the profile and event values.

setObjects routine 112 is depicted in FIG. 10b. In loop 114, the routine uses a FILO (first in—last out) stack to drill down to data nodes at the end of paths in structure 29. When a data node is reached, KIDS 67 equals 0, routine 112 fetches the link in CHILD 65 to retrieve an information object in 70 and set its FLAG 73 "On". In loop 116 routine 112 iterates through a data node's siblings. When the last node is popped off the stack, control returns to the calling routine 102, otherwise loop 120 processes nodes at the next level of structure 29.

Figures 11, 12:
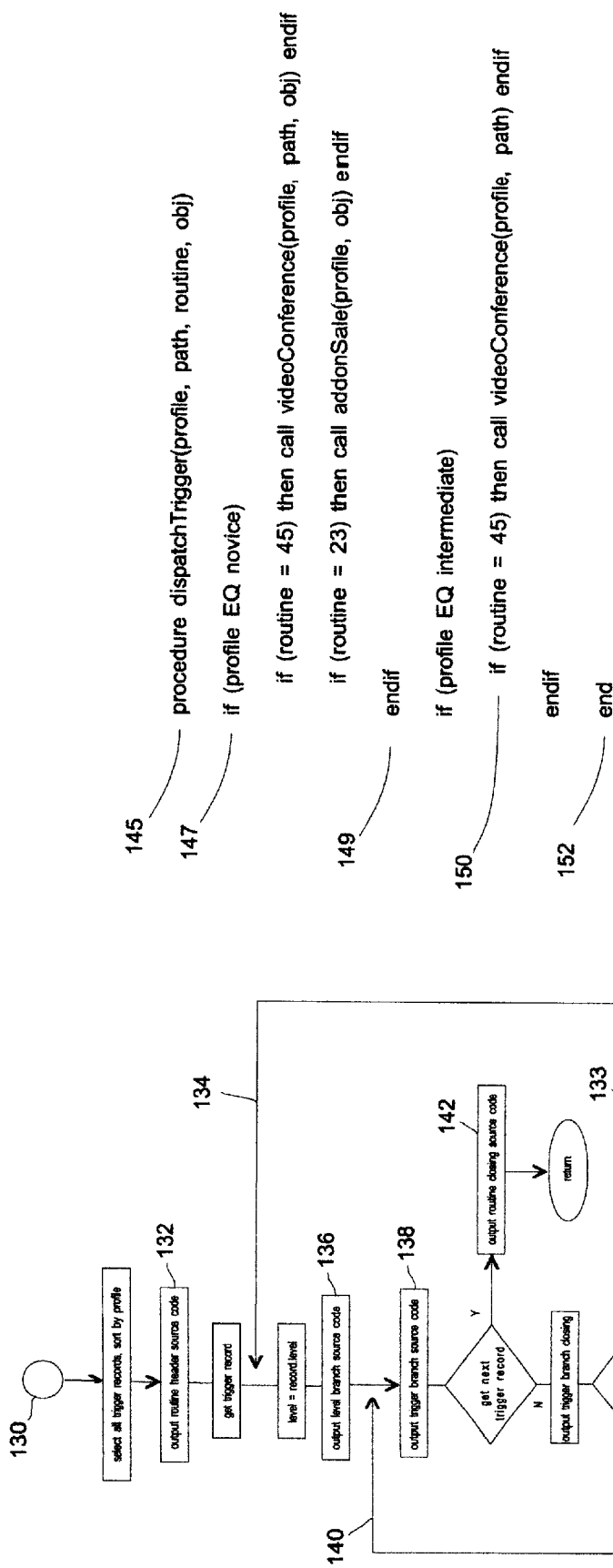
FIG. 11 depicts a flow chart of an embodiment of a software routine in present invention that generates source code for the dispatch routine.
FIG. 12 depicts a block of pseudo code that represents the primary source code components of the dispatch routine.

FIG. 11 depicts the flow chart of the program logic of routine 130 that generates source code for the dispatchTrigger routine 145 depicted in FIG. 12. The executable image of dispatchTrigger routine 145 runs on server 15 as dispatch file 28 and communicates with other menu files 24 that are responsible for content menu 21 and generating end-user profiles. Both routine 130 and dispatchTrigger 145 represent advances brought about by the present invention in creating real-time marketing opportunities based on the prior art of end-user profiles.

First, routine 130 sorts all trigger routine elements in database 90 by profile level 94 and trigger code 92. Next, routine 130 outputs source code for the dispatch routine 145 header at 132 that corresponds to line 145 in FIG. 12. Next, program control drops to loop 134. Here routine 130 generates source code at 136 for each profile type block header that corresponds to line 147. In inner loop 140 routine 130 generates source code for each trigger routine associated with the current profile type. When the profile type changes at 135 control flows back through loop 134 and profile level closing source code like pseudo line 149 is output at 133. When all the trigger elements have been processed the routine generates source code to complete the dispatchTrigger program and return control to the routine that called 130.

And finally. FIG. 12 depicts a block of pseudo code of dispatchTrigger 145, generated by routine 130 of authoring 23 in the present invention. The executable file representing this program logic resides on server 15 and is called before and after each trigger event.

Prior to calling dispatchTrigger scripts on server 15 associated with the present invention fetches BCODE 74 and ACODE 75 codes from the information object in 70 selected by the end-user. Next, the script extracts identifier 92, the unique trigger routine number, from the subfield position in 95 corresponding to the end-user profile associated with the menu path selected by the end-user.

With this information the script file calls dispatchTrigger passing four arguments: profile, path, routine, and obj. Profile represents the end-user profile code. Path represents a pointer to the series of topics in the menu path taken by the end-user. Obj represents current information object and routine represents the designated trigger routine.

The dispatchTrigger routine 145 branches out to each profile type using blocks of program control like source code found between lines 147 and 149. Within each profile block routine 145 tests for each routine value. When a match is found routine 145 calls the trigger routine passing a predefined number of arguments like line 150.Upon return control flows back to the calling routine.

CONCLUSION

This concludes the description of an embodiment of the invention. The foregoing description of the embodiment of the invention has been presented for the purpose of illustration and description. It is not intended to be exhaustive or limit the invention to the precise form disclosed. Many

What is claimed is:

1. An menu management system consisting of, creating and maintaining an open hierarchical data structure consisting of topic nodes and links that connect to an information object, generating a content menu based on said open hierarchical data structure, generating a end-user profile based on a menu path selected by an end-user in said content menu, managing a collection of trigger routines, displaying a configuration interface associated with an authoring system that enables a menu developer to link a trigger routine in said collection of routines to said information object, calling said trigger routine associated with said information object based on said end-user profile, generating an interactive event based on said trigger routine.

2. The menu management system of claim 1 is implemented in a computer program language that is compatible with at least one computer operating system.

3. The end-user profile in menu management system of claim 1 wherein further includes generating codes that designate differences in content mastery and word usage.

4. The management of a collection of trigger routines in menu management system of claim 1 wherein further includes adding and removing said trigger routine from said collection of trigger routines.

5. The configuration interface of claim 1 wherein further includes assigning an end-user profile when linking said trigger routine in said collection of trigger routines to said information object.

6. The configuration interface of claim 1 wherein further includes selecting when to call said trigger routine linked to said information object where settings include at least before and after a trigger event.

7. The authoring system of claim 1 wherein further includes generating a file that runs on a server and calls said trigger routine at runtime.

8. The authoring system of claim 1 wherein further includes establishing and maintaining links that associate said end-user profile with said trigger routine on said information object.

9. The authoring system of claim 1 wherein further includes creating a trigger routine in said collection of trigger routines for each type of said end-user profile.

10. The authoring system of claim 1 wherein further includes managing said collection of trigger routines where no said trigger routine in said collection of trigger routines has the same number or type of argument.

11. An menu management system consisting of, the means for creating and maintaining an open hierarchical data structure consisting of topic nodes and links that connect to an information object, the means for generating a content menu based on said open hierarchical data structure, the means for generating a end-user profile based on a menu path selected by an end-user in said content menu, the means for managing a collection of trigger routines, the means for displaying a configuration interface associated with an authoring system that enables a menu developer to link a trigger routine in said collection of routines to said information object, the means for calling said trigger routine linked to said information object based on said end-user profile.

12. The menu management system of claim 11 is implemented in a computer program language that is compatible with at least one computer operating system.

13. The end-user profile in menu management system of claim 11 wherein further includes the means for generating codes that designate differences in content mastery and word usage.

14. The management of a collection of trigger routines in menu management system of claim 11 wherein further includes the means for adding and removing said trigger routine from said collection of trigger routines.

15. The configuration interface of claim 11 wherein further includes the means for assigning an end-user profile when linking said trigger routine in said collection of trigger routines to said information object.

16. The configuration interface of claim 11 wherein further includes the means for selecting when to call said trigger routine linked to said information object where settings include at least before and after a trigger event.

17. The authoring system of claim 11 wherein further includes the means for generating a file that runs on a server and calls said trigger routine at runtime.

18. The authoring system of claim 11 wherein further includes the means for establishing and maintaining links that associate said end-user profile with said trigger routine on said information object.

19. The authoring system of claim 11 wherein further includes the means for creating a trigger routine in said collection of trigger routines for each type of said end-user profile.

20. The authoring system of claim 11 wherein further includes the means for managing said collection of trigger routines where no said trigger routine in said collection has the same number or type of arguments.

* * * * *